Oct. 29, 1968  A. P. RATAY  3,407,497
COAXIAL CABLE STRIPPING DEVICE
Filed Feb. 23, 1967
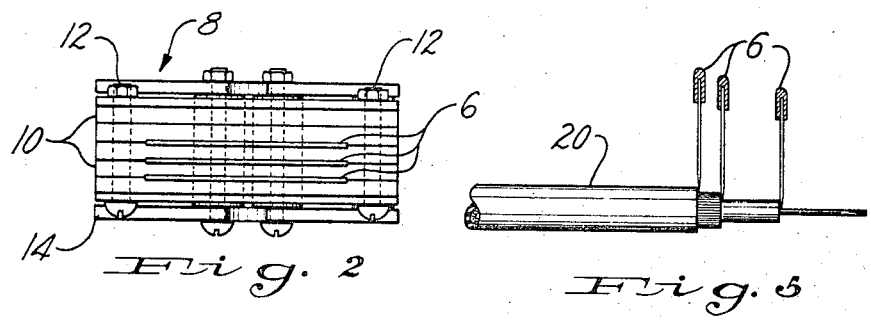
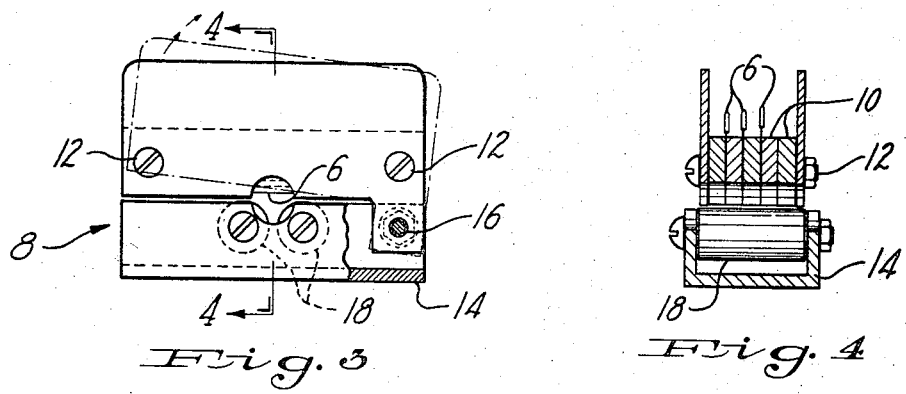
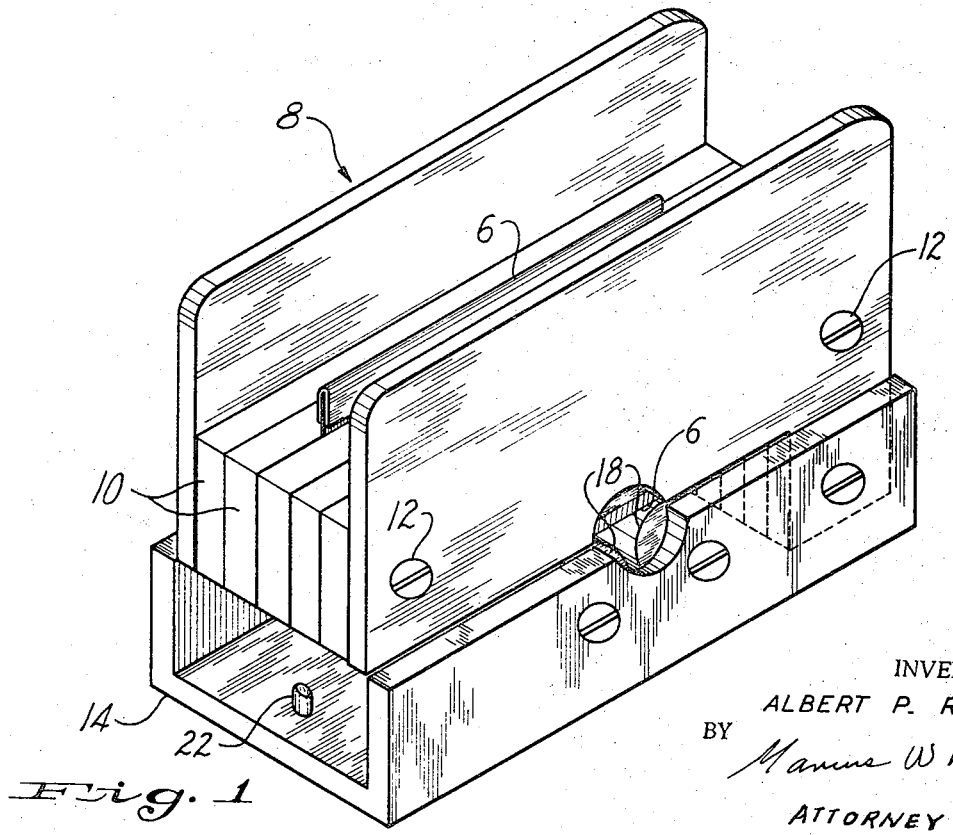
INVENTOR.
ALBERT P. RATAY
BY Maurice W Dodd
ATTORNEY

United States Patent Office 3,407,497
Patented Oct. 29, 1968

3,407,497
COAXIAL CABLE STRIPPING DEVICE
Albert P. Ratay, 100 Rawlins Run Road,
Pittsburgh, Pa. 15238
Filed Feb. 23, 1967, Ser. No. 617,927
2 Claims. (Cl. 30—91.2)

ABSTRACT OF THE DISCLOSURE

A simple hand device for stripping insulation from coaxial cable and preparing it for connection comprising a base piece having mounted therein three or more razor blades situated so as to cooperate with another piece having a pair of rollers mounted therein with their axes at right angles to the cutting edge of the razor blades, the said blades being adjusted at three different heights so that when wire is inserted therein the coaxial cable is cut properly for connection.

BACKGROUND OF THE INVENTION (1) *Field of the invention*

Coaxial cable for use in relaying high frequency electronic signals comprises an inner conductor and an outer or shielding conductor which extends around in cylindrical fashion the inner conductor. Therebetween and therearound there is provided insulation. It is necessary for connections that the insulation over part of the conductors be removed at the end of the coaxial cable so as to provide room for connection or for exposed surfaces for connection. A device is therefore needed which can readily remove this insulation from the coaxial cable to provide a properly prepared end of the coaxial cable so as to make an electronic connection.

(2) *Description of the prior art*

In the prior art numerous devices have been made for removing insulation for coaxial cable for various different purposes. Attention is called to the following references, Imman et al. 2,265,537; Miller 2,778,255; Huff 2,141,002; Matthews 3,204,495; Way 3,212,369; Froschhauser 1,670,250; and Goetz 3,221,576. Of these references, Huff, Miller and Imman are directed to coaxial cable stripping devices whereas the remaining references are directed to stripping devices in general. The above references teach the need for a device for cutting coaxial cable. Miller teaches a pair of pliers concept having three different cutting locations and providing that the coaxial cable may be inserted first in an opening 20, thence in an opening 22 and then in an opening 24, so as to provide cutting at the desired three points in the coaxial cable. In this device the cutting is done first in three different steps. Huff is directed to the general field of stripping cable and is a device which fits around a piece of cable with a single knife therein which moves into the cable and then as the device is moved, cuts or slips the insulation longitudinally. Imman discloses a coaxial cable stripper which fits over the end of the coaxial cable and has two sharp pointed screws which may be adjusted to desired depths which extend through the wall of the stripper and when the stripper is rotated, cut the coaxial cable to the desired depth as adjusted by the cutting devices numbered therein on FIGURE 1 as 24 and 25.

SUMMARY OF THE INVENTION

A simple hand device for stripping insulation from coaxial cable and preparing it for connection comprising a base piece having mounted therein three or more razor blades situated so as to cooperate with another base piece having a pair of rollers mounted therein with their axes at right angles to the cutting edge of the razor blades, the said blades being adjusted at three different heights so that when wire is inserted therein, the coaxial cable is cut properly for connection.

BRIEF DESCRIPTION OF THE DRAWINGS

FIGURE 1 is a showing in perspective from above of a device in accordance with my invention.

FIGURE 2 is a plan view of a cutting tool in accordance with my invention.

FIGURE 3 is a front view of the apparatus shown in FIGURE 2.

FIGURE 4 is a cross sectional view taken along the line 4—4 of the apparatus shown in FIGURE 3.

FIGURE 5 is a schematic showing of a coaxial cable with the cutting blades located thereagainst as they would appear when the cable is being cut if the other parts of the tool were removed.

DESCRIPTION OF PREFERRED EMBODIMENTS

In accordance with my invention I provide a plurality, preferably three, cutting blades 6 preferably in the nature of razor blades which are located parallel to each other and which have their cutting edges disposed in a different plane. These blades are mounted in a holding device 8 comprising a plurality of plates 10 interspersed between and on each side of the razor blades and being fastened together by a bolt 12 therethrough at each end of the plates. The plates themselves are adapted to be cooperating with a base piece 14 which is connected to the holding plates by means of a high friction hinge joint 16. The base piece 14 has located therein a pair of rollers 18 having their axes ends perpendicular to the cutting edges of the three blades so as to hold a coaxial cable 20 against the blades while it is being rotated about its axis. In the operation of my invention, the coaxial cable 20 is placed in region between the cutting blade and the rollers on the base piece. As the coaxial cable 20 is rotated, or conversely, as the cutting device 8 is rotated about the coaxial cable, the blades are cut into the insulation, the outer and the inner insulation, successively or respectively. As the blade is gradually cut into, the bottom blade closes closer to the top piece of the cutting blade until the main body of the cutting piece is the main body of the base piece. At this point, the wire has been prepared by cutting at the right places for removal of insulation. I have found that razor blades, although they are very fine and are relatively weak, nevertheless, are sufficiently strong that when the coaxial cable is properly cut to scrape off or remove the insulation from the coaxial cable leaving the coaxial cable itself prepared in the proper manner for connection. I have provided a high friction joint between the base piece and the cutting assembly so that the device may be pressed against the coaxial cable and that an operator can rotate this cutting device with his hand. Since the operator is required by the natural configuration of the human hand to remove his hand and replace it again in a different configuration, therefore I have provided a device such that the wire stripper, in accordance with my invention, will retain its position on a cable without being held there during the time intervals between rotation. Thus, with a great deal of ease and simple dexterity, the operator may rotate a bit, change his hand, rotate again, change his hand and rotate again so as to provide a smooth, easy cutting motion until the device has completely cut through the coaxial cable ready for the actual stripping operation.

Further, in accordance with my invention, in order to aid accurate adjustment, I provide a device for adjusting the relative height of the blades, comprising a die preferably of a softer metal such as aluminum or plastic which effectively has the configuration of a properly prepared coaxial cable 20 as shown in FIGURE 5. Preferably the device for adjusting the blades comprises a cylindrical piece having a diameter equal to the outside diameter of the coaxial cable and having a plurality of circular slots along its length of depth corresponding to the desired relative depth of the blades.

In accordance with a preferred embodiment of my invention, I provide a spreader 22 attached to the base piece 14 for spreading the copper braid sheath after cutting the cable. The spreader comprises a hollow rivet driven through a hole in the base piece 14 so as to produce a solid press fit, and extending therebeyond with a sharpened nose, sharpened only on the outside. Thus, the cable end may be inserted in the spreader and as it is pushed in the spreader will spread the copper webbing of the shielding layer and bend it back upon itself for ease of attachment.

I claim as my invention:

1. Apparatus for stripping coaxial cable comprising a plurality of parallel plates, a plurality of flat cutting blades therebetween and extending therebeyond, a base piece hingeably connected to said plates to hold said cable against said blades and between said base piece and said plate and having a groove therein for holding said cable in position, and a pair of transverse rollers provided on said base piece on the side thereof toward said blades for holding said cable against said blades.

2. A wire stripping device for coaxial cable comprising a plurality of cutting blades in spaced relation, each extending downward a different distance; a backup piece cooperating with said blades to hold said cable against said blades, a plurality of holding plates between which the blades are interspersed, a web shielding spreader extending through and beyond said backup plate comprising a hollow cylindrical shaft tapered at the end thereof from the inside diameter outward toward the shank of said spreader.

References Cited

UNITED STATES PATENTS

| | | | |
|---|---|---|---|
| 2,356,328 | 8/1944 | Lindgren | 30—90.7 |
| 2,385,368 | 9/1945 | Montgomery | 30—91.1 X |
| 2,659,140 | 11/1953 | Davison | 30—91.1 |
| 2,662,283 | 12/1953 | Gienger | 30—90.8 |
| 2,683,308 | 7/1954 | Cook | 30—91.1 |
| 2,704,000 | 3/1955 | Miller | 30—91.2 |
| 3,254,407 | 6/1966 | Apa et al. | 30—91.2 |
| 3,257,722 | 6/1966 | Caine | 30—90.1 |

FOREIGN PATENTS 705,668   3/1954   Great Britain.

MYRON C. KRUSE, *Primary Examiner.*